United States Patent [19]

Kobayashi et al.

[11] Patent Number: 4,462,057

[45] Date of Patent: Jul. 24, 1984

[54] A.C. SWITCHING CIRCUIT

[75] Inventors: Masato Kobayashi, Shijonawate; Hideki Fukuzono, Osaka; Hiromi Nishimura, Takatsuki, all of Japan

[73] Assignee: Matsushita Electric Works, Ltd., Osaka, Japan

[21] Appl. No.: 412,244

[22] Filed: Aug. 27, 1982

[30] Foreign Application Priority Data

Sep. 4, 1981 [JP] Japan ............................... 56-139944

[51] Int. Cl.³ ......................... H02H 3/00; H02H 7/00

[52] U.S. Cl. ........................................... 361/2; 361/3; 361/7

[58] Field of Search .................................... 361/2, 3, 7

[56] References Cited

U.S. PATENT DOCUMENTS 3,283,179 11/1966 Carlisle et al. .......................... 361/7

FOREIGN PATENT DOCUMENTS 963007 7/1964 United Kingdom .................... 361/7

*Primary Examiner*—George H. Miller, Jr.
*Assistant Examiner*—Patrick W. Foster
*Attorney, Agent, or Firm*—Burns, Doane, Swecker & Mathis

[57] ABSTRACT

A.C. switching circuit capable of opening and closing contacts without generating any arc. When D.C. source restores from its interruption, the contacts are maintained in or shifted to a predetermined state. A change-over switch is provided for selecting as required whether the contacts are to be forcibly opened or closed after the D.C. source interruption, or whether the previous state of the contacts is to be maintained.

4 Claims, 7 Drawing Figures

A.C. SWITCHING CIRCUIT

BACKGROUND OF THE INVENTION

The present invention relates to an A.C. switching circuit which is inserted between an A.C. source and a load circuit and is capable of preventing an arc from being generated between contacts upon their opening or closing operation.

There has been suggested one of the A.C. switching circuits of the kind referred to in, for example, German Pat. No. 1,161,618, but the circuit of this patent still has been defective in the following respects. According to the patent, a first relay switch is connected in series with an A.C. source and a load, a series circuit of a diode and second relay switch is inserted in parallel to the first relay switch, and the two relay switches are opened or closed respectively by a further relay which is driven by a flip-flop. However, it is difficult to control the opening and closing operations of the first and second relay switches at a proper timing. More specifically, the second realy switch is closed during each negative half cycle of the A.C. source current to apply a positive voltage to the diode so as to prevent the arc generation at the second relay switch, while the first relay switch is closed during each positive half cycle of the source current, upon which closing the arc generation is also prevented from occurring because of the same potential with the diode. Further, the first relay switch is opened during the positive half cycle of the source current and the second relay switch is opened during the negative half cycle to prevent the arc generation. However, this operation has the disadvantage of requiring the relay switches opened and closed in a very accurately timed relation. In addition, in the case where the relays are of latching type and D.C. source voltage restores from an interruption, it is necessary to initially reset the relays and to subsequently detect the state of the flip-flop, whereby the circuit arrangement has been made rather complicated.

SUMMARY OF THE INVENTION

Accordingly, a primary object of the present invention is to provide an A.C. switching circuit which can automatically prevent any arc from being generated upon opening and closing operations of switching contacts.

Another object of the invention is to provide an A.C. switching circuit which can automatically open the contacts when D.C. source restores from an interruption.

A further object of the invention is to provide an A.C. switching circuit which can maintain, if required, a previous state of the contacts upon the restoration of the D.C. source from the interruption.

Still another object of the invention is to provide an A.C. switching circuit which can automatically open the contacts when the D.C. source is restored after its interruption and automatically prevent any arc from being generated upon opening and closing operations of the contacts.

A still further object of the invention is to provide an A.C. switching circuit which can maintain, as required, the contacts in the previous state at the time of the restoration of the D.C. source from the interruption while automatically preventing the arc generation from occurring upon the opening and closing operations of the contacts.

BRIEF DESCRIPTION OF THE DRAWINGS

Other objects and advantages of the present invention will become clear from the following description of the invention detailed with reference to accompanying drawings, in which:

FIGS. 1A through 1C show a circuit diagram of a preferred embodiment of an A.C. swtiching circuit in accordance with the present invention, in which FIGS. 1A and 1B are to be referred to as joined as shown in FIG. 1C;

DESCRIPTION OF THE PREFERRED EMBODIMENTS

Figure 1A:
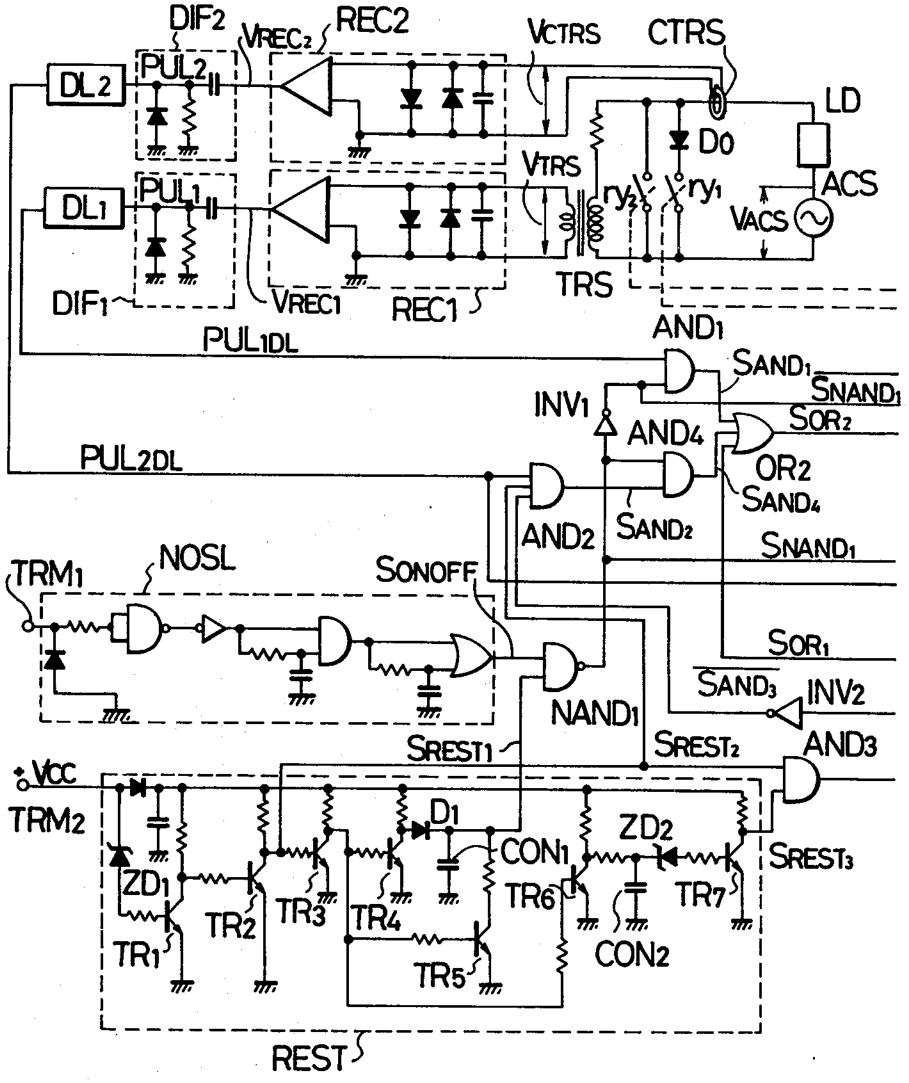

While the A.C. switching circuit of the present invention shall now be detailed with reference to the preferred embodiment shown in the drawings, it should be understood that the description is made only for ready understanding of the invention and the intention is not to limit the invention only to that embodiment but rather to cover all alterations, modifications and equivalent arrangements possible within the scope of appended claims.

The A.C. switching circuit according to the present invention is capable of performing various operations under various conditions for achieving the respective objects of the invention, and such operations shall be detailed respectively in the followings in conjunction with the circuit arrangement shown in the drawings.

Figure 1B:
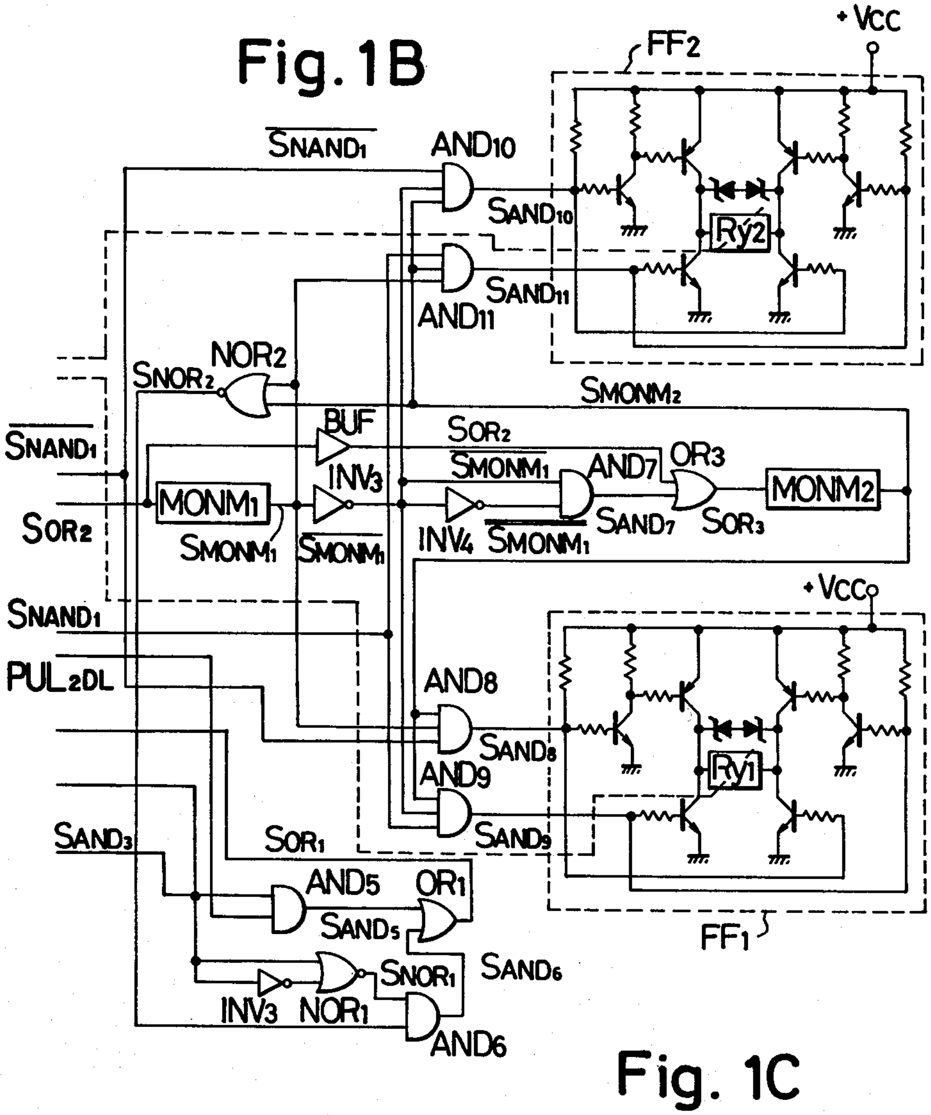
Figure 1C:
Figure 2A:
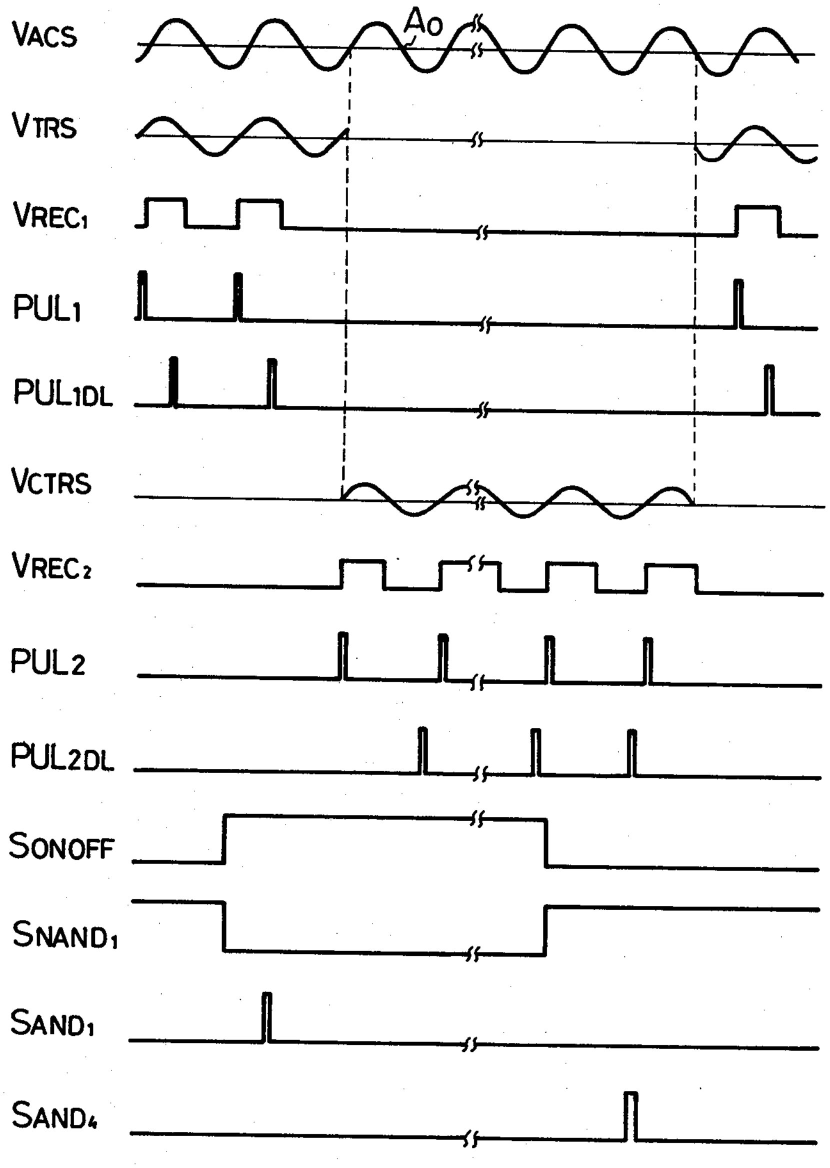
FIGS. 2A and 2B are explanatory views for the opening and closing operations of contacts without any arcing in the circuit of FIG. 1 during a steady supply of an A.C. source voltage.
Figure 2B:
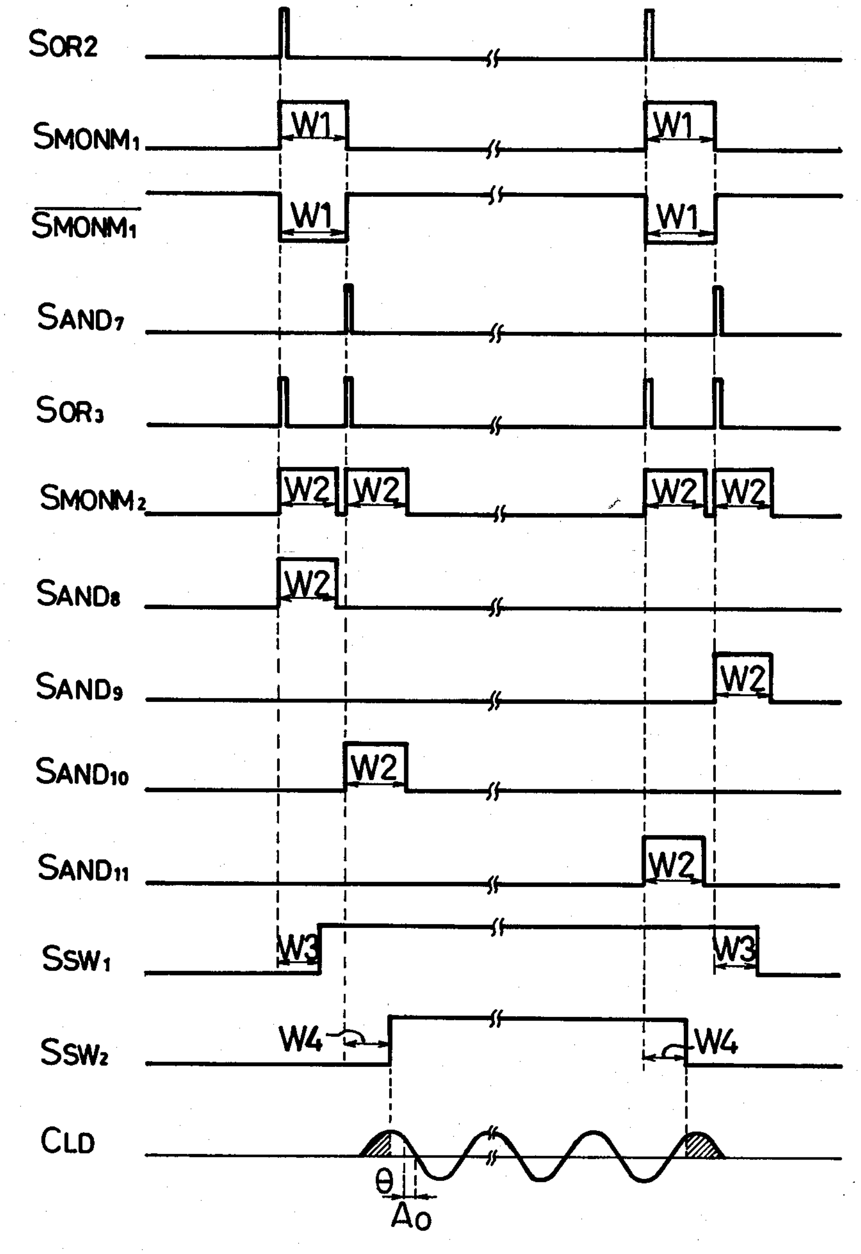
Figures 3A, 3B:
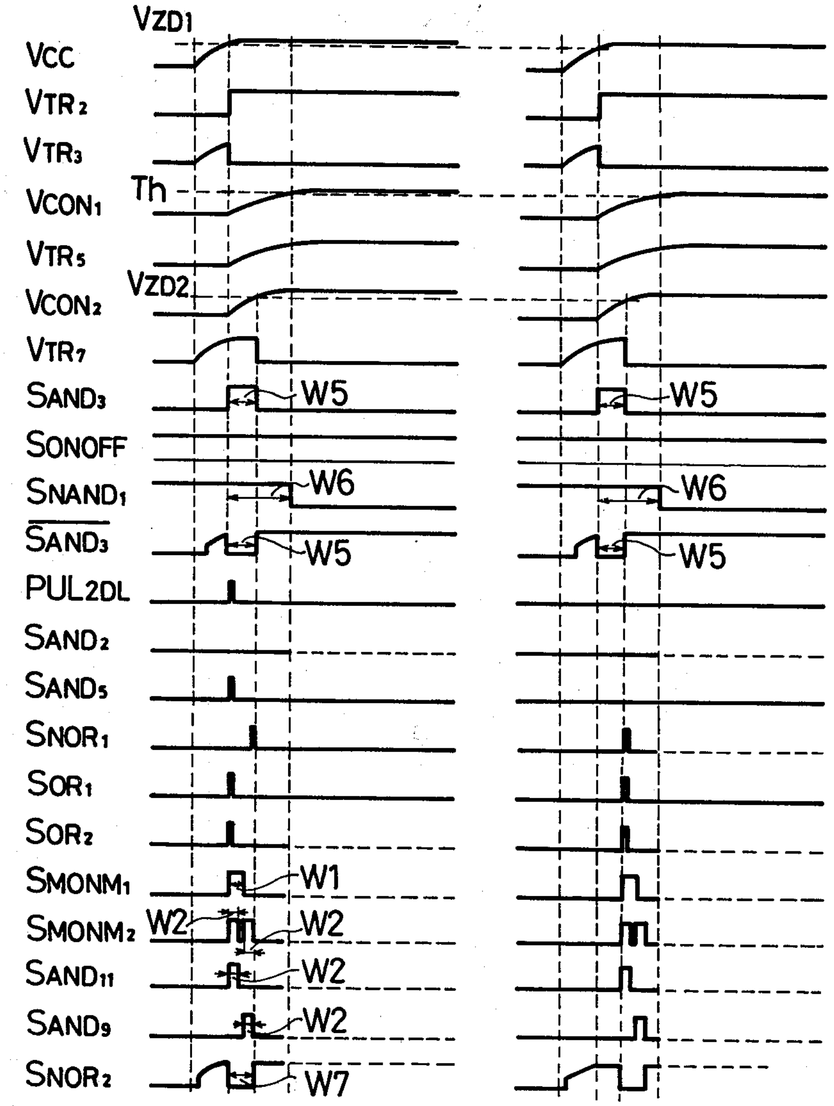
FIGS. 3A and 3B are explanatory views for a forcible contact opening and closing operations in the circuit of FIG. 1 at the time when the D.C. source restores from its interruption.

I. Contact Opening and Closing Operations with A.C. Source Voltage Being Steady:

Referring to FIGS. 1 through 3, an A.C. source ACS is applying a voltage $V_{ACS}$ to a load circuit LD through a parallel circuit of relay contacts ry1 and ry2. A diode $D_o$ is connected in series with the relay contact ry1 and a primary winding of a transformer TRS is connected in parallel to the relay contact ry2.

(1) When ry1 and rys in open state are closed:

So long as the contacts ry1 and ry2 are open, the voltage $V_{ACS}$ is applied to the primary winding of TRS through the load LD, whereby a voltage $V_{TRS}$ is provided across a secondary winding of TRS, which voltage is made to be a rectangular-wave voltage $V_{REC1}$ by a rectangular-wave forming circuit REC1. The voltage $V_{REC1}$ is modified by a differentiation circuit $DIF_1$ to a pulse $PUL_1$ of a small width for detecting the open or closed state of the relay contacts and is further modified by a delay circuit $DL_1$, becoming delay pulse $PUL_{1DL}$. On the other hand, a current transformer CTRS is disposed adjacent a junction between the load LD and the relay contacts ry1 and ry2. A detection output $V_{CTRS}$ of this CTRS is subustantially zero, since a current flowing through the primary winding of TRS through the load LD is of a small value. Therefore, an output $V_{REC2}$ of another rectangular-wave forming circuit $REC_2$, another contact state detecting pulse $PUL_2$ provided as an output of another differentiation circuit $DIF_2$ and another delay pulse $PUL_{2DL}$ provided as an output of another delay circuit $DL_2$ are all zero.

When an instruction for closing the contacts ry1 and ry2 is applied to an input terminal $TRM_1$, that is, when an instruction signal $S_{ONOFF}$ for opening or closing ry1 and ry2 is at its high level, a signal applied through a noise limiter NOSL to one of input terminals of a NAND gate $NAND_1$ (which may be regarded substantially as identical to the signal $S_{ONOFF}$ and thus shall be referred to hereinafter as the signal $S_{ONOFF}$) is also made at a high level. An output from the gate $NAND_1$ varies according to an input applied to the other input terminal. Here, a signal being provided to an input terminal $TRM_2$ of a reset-signal generating circuit REST in a D.C. voltage $V_{cc}$. As a result, a high level signal $S_{REST1}$ is provided to the other input terminal of $NAND_1$ which thus generates an output signal $S_{NAND1}$ of low level, as will be detailed in the following.

An AND gate $AND_1$ receives at an input terminal an inverted signal $\overline{S_{NAND1}}$ of $S_{NAND1}$ as inverted by an inverter $INV_1$ and at the other input terminal the pulse signal $PUL_{1DL}$, and thus the gate $AND_1$ generates an output $S_{AND1}$ in response to $PUL_{1DL}$. On the other hand, an AND gate $AND_2$ receives at first one of three input terminals the delay pulse $PUL_{2DL}$, at second input terminal another output signal $S_{REST2}$ from the reset signal generator REST and at third input terminal an inverted signal $\overline{S_{AND3}}$ to which a logical product signal $S_{AND3}$ from an AND gate $AND_3$ of the signal $S_{REST2}$ and a further signal $S_{REST3}$ of REST is inverted by an inverter $INV_2$. Since $PUL_{2DL}$ is at low level, the gate $AND_2$ generates a low level output $S_{AND2}$, while an AND gate $AND_4$ receiving $S_{NAND1}$ and $S_{AND2}$ produces an output signal $S_{AND4}$ of low level.

The signal $S_{AND3}$ is provided to an AND gate $AND_5$ which also receives $PUL_{2DL}$ and, as this $PUL_{2DL}$ is at low level, the gate $AND_5$ generates a low level output signal $S_{AND5}$. As will be referred to later, $S_{AND3}$ is at low level because a constant voltage $V_{cc}$ is applied to the terminal $TRM_2$. Therefore, an NOR gate $NOR_1$ receives $S_{AND3}$ and $\overline{S_{AND3}}$, the latter being inverted here by means of an inverter $INV_{3'}$ and generates a low level output $S_{NOR1}$. An output $S_{AND6}$ of an AND gate $AND_6$ receiving at one input terminal the signal $S_{NOR1}$ from $NOR_1$ is kept always at low level regardless of the input level applied to the other input. Further, an OR gate $OR_1$ receives $S_{AND5}$ and $S_{AND6}$ and generates a low level output signal $S_{OR1}$.

An OR gate $OR_2$ receiving the signals $S_{AND1}$, $S_{AND4}$ and $S_{OR1}$ produces an output signal $S_{OR2}$ substantially of the same contents as $S_{AND1}$, because $S_{AND4}$ and $S_{OR1}$ are both at low level as has been explained above. The signal $S_{OR2}$ is provided to a monostable multivibrator $MONM_1$ to be converted to a signal $S_{MNOM1}$ having a pulse width $W_1$, which is provided through the inverter $INV_3$ to an AND gate $AND_7$ and its inverted signal $\overline{S_{MONM1}}$ through an inverter $INV_4$ is provided also to this gate $AND_7$. While the gate $AND_7$ receives the signal $\overline{S_{MONM1}}$ and its re-inverted signal $\overline{\overline{S_{MONM1}}}$, the latter of which is slightly delayed with respect to $\overline{S_{MONM1}}$ because the inverter $INV_4$ has an inherent delay time and, as a result, the AND gate $AND_7$ provides at its output terminal an output pulse signal $S_{AND7}$ of a short pulse width and delaying by a width $W_1$ with respect to $S_{OR2}$.

Since an OR gate $OR_3$ which receiving at an input terminal the signal $S_{AND7}$ also receives at the other input terminal the signal $S_{OR2}$ through a buffer BUF, the gate $OR_3$ provides an output signal $S_{OR3}$ which including the pulse of $S_{OR2}$ and another pulse also of a short width and delaying by the width $W_1$ with respect to $S_{OR2}$, whereby a monostable multivibrator $MONM_2$ is coused to provide at its output terminal an output signal $S_{MONM2}$ comprising two pulses respectively of a pulse width $W_2$ smaller than the width $W_1$ and appearing with a slight time interval ($W_1$-$W_2$). A NOR gate $NOR_2$ receiving the signal $S_{MONM2}$ also receives the signal $S_{MONM1}$ and generates a high level signal $S_{NOR2}$ which is provided to an AND gate $AND_6$ only when the input signals are both at low level. However, this will not affect the operation of the switching circuit as has been explained above.

An AND gate $AND_8$ receives the signals $\overline{S_{NAND1}}$, $S_{MONM1}$ and $S_{MONM2}$ and provides at its output terminal an output signal $S_{AND8}$ having the pulse width $W_2$, an AND gate $AND_9$ receives $S_{NAND1}$, $\overline{S_{MONM1}}$ and $S_{MONM2}$ and provides an output signal $S_{AND9}$ of the width $W_2$, an AND gate $AND_{10}$ receives $\overline{S_{NAND1}}$, $\overline{S_{MONM1}}$ and $S_{MONM2}$ and provides an output signal $S_{AND10}$ of the width $W_2$, and an AND gate $AND_{11}$ receives $S_{NAND1}$, $S_{MONM1}$ and $S_{MONM2}$ and provides an output signal $S_{AND11}$ also of the width $W_2$. There exists a time interval ($W_1$-$W_2$) between the respective pulses of $S_{AND8}$ and $S_{AND10}$ and also between those of $S_{AND9}$ and $S_{AND11}$, whereas a time interval substantially equal to the high level duration of $S_{ONOFF}$ exists between the pulse of $S_{AND8}$ and those of $S_{AND9}$ and $S_{AND11}$ and between the pulse of $S_{AND10}$ and those of $S_{AND9}$ and $S_{AND11}$.

The signals $S_{AND8}$ and $S_{AND9}$ are provided to a flip-flop $FF_1$ for driving a latching relay $R_{y1}$ which operates the relay contact ry1, while the signals $S_{AND10}$ and $S_{AND11}$ are provided to a flip-flop $FF_2$ for a latching relay $R_{y2}$ operating the relay contact ry2. The flip-flop $FF_1$ is activated in response to $S_{AND8}$ to cause a current to flow through the relay $R_{y1}$ in a rightward direction in FIG. 1 and the relay contact ry1 to be closed, whereas the flip-flop $FF_2$ responds to $S_{AND10}$ to cause a current to flow through the relay $R_{y2}$ also in the rightward direction and the relay contact ry2 closed.

Since the pulse $PUL_1$ is being generated when the voltage $V_{TRS}$ delayed with respect to the voltage $V_{ACS}$ alters from its negative half cycle to the positive half cycly, $PUL_{1DL}$ is positioned in the positive half cycle of $V_{TRS}$, and $S_{MONM1}$ rises at the positive half cycle of $V_{TRS}$ and, after the pulse width $W_1$, falls at the negative half cycle. In other words, $S_{MONM1}$ rises at the positive half cycle of $V_{ACS}$ and drops at its negative half cycle, whereas $S_{MONM2}$ rises at the both positive and negative half cycles of $V_{ACS}$. $S_{AND8}$ and $S_{AND10}$ rise respectively at each of the positive and negative half cycles of $V_{ACS}$. The relay contact ry1 requires a time $W_3 (\leqq W_2)$ for its closing operation but, by setting the terminating point of the time $W_3$ running from the rising point of $S_{AND8}$ to be in the negative half cycle of $V_{ACS}$, the relay contact ry1 can be closed during the negative half cycle of $V_{ACS}$ so that any arc can be prevented from occurring. Similarly, the relay contact ry2 requires a time $W_4$ $(\leqq W_2)$ for the closing but, by setting the time $W_4$ from the rising of $S_{AND10}$ to be in the positive half cycle of $V_{ACS}$, ry2 can be closed during the positive half cycle of $V_{ACS}$ without any arc generation. As will be clear from a comparison of respective states of the contacts denoted by $S_{SW1}$ and $S_{SW2}$ with $V_{ACS}$, there is applied to the load LD through ry1 and ry2 a current $C_{LD}$ which has an angle of lag $\theta$ with respect to $V_{ACS}$ and partly flows through the diode $D_o$ during periods shown as hatched in the wave-form diagram of FIG. 2B, whereby any arcing at the time of closing ry2 can be prevented.

It will be clear that ry2 is closed during the positive half cycle of $V_{ACS}$ since $V_{ACS}$ and $C_{LD}$ respectively have a zero-cross $A_o$ at an identical time point.

(2) When ry1 and ry2 in closed state are opened:

So long as the contacts ry1 and ry2 are closed, the current $C_{LD}$ is supplied to the load LD from the source ACS and the respective voltages $V_{TRS}$, $V_{REC1}$ and pulses $PUL_1$, $PUL_{1DL}$ are all at low level and the respective wave-forms and pulses of the voltages $V_{CTRS}$, $V_{REC2}$ and pulses $PUL_2$, $PUL_{2DL}$ appear. The signal $S_{AND1}$ is at low level because $PUL_{1DL}$ is at low level. The signal $S_{AND2}$ of the logical product of $PUL_{2DL}$, $S_{REST2}$ and $\overline{S_{AND3}}$ will be at high level only when $PUL_{2DL}$ is at high level, because $S_{REST2}$ and $\overline{S_{AND3}}$ are both at high level as will be clear from the foregoing.

When the signal $S_{ONOFF}$ is turned to be low level, the signal $S_{NAND1}$ becomes high level. The signal $S_{AND4}$ is a logical product of $S_{NAND1}$ and $S_{AND2}$ and is thus substantially of the same contents as $S_{AND2}$. The signal $S_{OR1}$ is at low level as will be clear from the foregoing and the signal $S_{OR2}$ is substantially of the same contents as $S_{AND4}$ and also as $S_{AND2}$.

Substantially in the same manner, $S_{AND8}$ to $S_{AND11}$ are applied to the flip-flops $FF_1$ and $FF_2$ which are activated in the order opposite to the above to cause a current to flow through the respective relays $R_{y1}$ and $R_{y2}$ in the direction opposite to each other, whereby the relay contact ry2 can be opened in a positive half cycle of Cld and the relay contact ry1 can be opened in its negative half cycle so that the arc generation can be effectively prevented.

II. Initial Stage Resetting with D.C. Source Restored from Long Interruption:

In the case when the D.C. voltage $V_{CC}$ being provided to the input terminal $TRM_2$ (which may be prepared from $V_{ACS}$ through a rectifier but may even be obtained from an independent source, as will be evident) is interrupted for a relatively long time (the interruption has lasted over a response time of the reset signal generating circuit REST) and is thereafter restored, the relay contacts ry1 and ry2 are to be forcibly opened. (This function is not performed upon a mere momentary interruption of the voltage).

(1) When the interruption has occurred in closed state of ry1 and ry2:

As soon as $V_{CC}$ restored reaches a Zener voltage $V_{ZD1}$ of a Zener diode $ZD_1$, a transistor $TR_1$ is made conductive, due to which a transistor $TR_2$ is made non-conductive and its collector voltage $V_{TR2}$ is made to be at high level ($V_{TR2}$ is provided as $S_{REST2}$). Upon non-conduction of ($TR_2$, a transistor $TR_3$ is conducted and its collector voltage $V_{TR3}$ exists as a pulse present up to this time from the beginning of the restoration of $V_{CC}$. Upon the conduction of $TR_3$, trnasistors $TR_4$ to $TR_6$ are made non-conductive, responsive to which of $TR_4$ and $TR_5$ a condenser $CON_1$ starts its charging through a diode $D_1$ to gradually increase a charging voltage $V_{CON1}$ as well as a collector voltage $V_{TR5}$ of the transistor $TR_5$, and this voltage $V_{TR5}$ is provided as $S_{REST1}$. By the non-conduction of $TR_6$, a charging of a condenser $CON_2$ is initiated and, when its charging voltage $V_{CON2}$ reaches a Zener voltage $V_{ZD2}$ of a A Zener diode $ZD_2$, a transistor $TR_7$ is conducted, upon which its collector voltage $V_{TR7}$ becomes low level. Therefore, the signal $S_{REST3}$ increases gradually from the beginning of the restoration of $V_{CC}$ to the non-conduction of $TR_7$. As the signal $S_{AND3}$ is a logical product of $S_{REST2}$ and $S_{REST3}$, the signal will be a pulse which rises in correspondence to the rise of $V_{TR2}$ and falls in correspondence to the fall of $V_{TR7}$, thus having a pulse width of $W_5$.

Under a condition where the signal $S_{ONOFF}$ is kept at high level, the high level signals $S_{ONOFF}$ and $S_{REST1}$ are applied to the gate $NAND_1$, so that the signal $S_{NAND1}$ is kept at high level until $S_{REST1}$, that is, $V_{CON1}$ reaches a predetermined level "Th".

While the signal $\overline{S_{AND3}}$ is provided to the gate $AND_2$ which also receiving $S_{REST2}$, this $\overline{S_{AND3}}$ is a signal which becomes high level gradually after $V_{CC}$ is restored to a predetermined level and becomes low level during the high level period of $S_{AND3}$. Since the pulse $PUL_{2DL}$ applied to the gate $AND_2$ is set to exist during the low level period of $\overline{S_{AND3}}$, $S_{AND2}$ is always at low level.

Since $S_{NAND1}$ is provided, together with $S_{AND2}$, to the gate $AND_4$, the signal $S_{AND4}$ is always at low level. Further, $\overline{S_{NAND1}}$ is kept at low level until $V_{CON1}$ reaches a predetermined level and $S_{NAND1}$ becomes low level, during which period $S_{AND1}$ is at low level (the time required for $V_{CON1}$ to reach the predetermined level "Th" from its initiation of increase shall be referred to as a width $W_6$).

As the pulse $PUL_{2DL}$ is present during the high level period of $S_{AND3}$, a corresponding pulse is included in the output $S_{AND5}$ of the gate $AND_5$. On the other hand, the signal $S_{NOR1}$ includes a period in which the both inputs to the gate $NOR_1$ become low level when $S_{AND3}$ falls, due to that the inverter $INV_3$ has an inherent delay time. The inputs to the gate $AND_6$ include $S_{NOR2}$ in addition to $S_{NOR1}$ but, as the level of $S_{NOR2}$ is not clear, references shall be made here with an assumption that $S_{OR1}$ includes $S_{AND5}$.

The signal $S_{OR2}$ is a logical sum of the signals $S_{AND1}$, $S_{AND4}$ and $S_{OR1}$, in which at least $S_{OR1}$ is at high level while others are low level, and $S_{OR2}$ has a pulse corresponding to that of $S_{OR1}$.

In the similar manner to the above, the signals $S_{MONM1}$, $S_{MONM2}$, $S_{AND11}$ and $S_{AND9}$ are generated to open the relay contacts ry2 and ry1 in this order, while preventing the arc generation. After the restoration of $V_{CC}$ to a predetermined level, $S_{NOR2}$ becomes gradually high level and thereafter is made at low level only during high level period ($W_1+W_2=W_7$) of $S_{MONM1}$ and $S_{MONM2}$. After the opening of the contacts, no pulse corresponding to $S_{NOR1}$ appears in $S_{AND6}$. $S_{NOR1}$ is useless here, since the relay contacts ry1 and ry2 are already opened.

(2) When the interruption has occurred in open state of ry1 and ry2:

In this case, the pulse $PUL_{2DL}$ is not present but the pulse $PUL_{1DL}$ appears, as will be clear from the foregoing descriptions. Under a condition where $S_{ONOFF}$ is at low level, $S_{NAND1}$ is at high level, and $S_{AND1}$ and $S_{AND4}$ are both at low level. While $S_{AND3}$ has a rectangular pulse of the width $W_5$, $PUL_{2DL}$ is at low level anr $S_{AND5}$ is made to be at low level. In the signal $S_{NOR1}$, however, a pulse of a short width appears as described in the above and, as $S_{MONM1}$ and $S_{MONM2}$ are both at low level at this time, $S_{NOR2}$ will be at high level. As a result, pulses appear in $S_{AND6}$, $S_{OR1}$ and consequently in $S_{OR2}$. In the similar manner to the above, the flip-flops $FF_1$ and $FF_2$ are activated to drive the latching relays $R_{y1}$ and $R_{y2}$. Since the relay contacts ry1 and ry2 have already been opened, however, this operation is effective only as a safety measure against a possible manual closing of the relay contacts ry1 and ry2 while $V_{ACS}$ has been interrupted.

As will be clear from the above, the relay contacts ry1 and ry2 can be forcibly opened in the case when $V_{CC}$ is restored after its interruption.

While the explanation has been made with reference to the case where the signal $S_{ONOFF}$ maintains the same state before and after the interruption of $V_{CC}$, it should be readily appreciated that the initial resetting operation can be achieved in the similar manner to the above even in an event where $S_{ONOFF}$ is altered after the $V_{CC}$ interruption and ry1 and ry2 are made open irrespective of the high level of $S_{ONOFF}$ or made closed irrespective of the low level of $S_{ONOFF}$. An explanation thereof is a repetition of the above and shall be omitted here.

While the above has been referred to in respect of the case where $V_{ACS}$ exists, the same operation can be performed even when $V_{ACS}$ does not exist due to a service interruption or the like. In the latter event, $PUL_{1DL}$ and $PUL_{2DL}$ are not present, but a rectangular pulse of the width $W_5$ is produced in $S_{AND3}$, whereby a pulse of a small width is produced in $S_{AND6}$, as well as in $S_{OR2}$, and these pulses will cause the same operation as above to be performed as to actute the flip-flop $FF_1$ and $FF_2$, resulting in the opening of ry1 and ry2. In this case, the opening is made without arc generation irrespective of the timing of the opening, since $V_{ACS}$ is absent. This should also apply to an event of such initial stage setting operation as would be referred to in the followings.

III. Initial Stage Setting with D.C. Source Restored from Interruption:

When $V_{CC}$ restores from its interruption, the relay contacts ry1 and ry2 are forcibly closed. It will be apparent that, for this purpose, an operation opposite to the initial resetting operation may be performed, that is, the high level signals are to be provided from the gates $AND_8$ and $AND_{10}$, instead of $AND_9$ and $AND_{11}$, and that, accordingly, $S_{NAND1}$ is to be made low level and $\overline{S_{NAND1}}$ is to be high level. Since it is apparent from the foregoing that ry1 and ry2 may be shifted from their open state to the closed state, it is obviously required only to insert an inverter INV at the output end of the gate $NAND_1$.

IV. Contact State Maintenance with D.C. Source Restored from Interruption:

Upon the restoration of $V_{CC}$ from its interruption, the relay contacts ry1 and ry2 are to be maintained in their previous state, that is, in the opened or closed state in which ry1 and ry2 have been set prior to the interruption. To this end, the respective outputs of the gates $AND_8$ to $AND_{11}$ should not be varied and, in this case, $S_{AND3}$ should have a high level pulse, as will be clear from the foregoings. Accordingly, $S_{REST3}$ should be at low level and, to achieve this, it may be sufficient that a junction point between the Zener diode $ZD_2$ and the condenser $CON_2$ is disconnected and a change-over switch is provided for connecting the Zener diode $ZD_2$ in parallel with a collector resistance of the transistor $TR_7$.

It will be appreciated from the above descriptions that, if the initial stage resetting and setting operations and contact state maintaining operation of the present invention are not required, then the respective elements $AND_2$, $AND_5$, $AND_6$, $INV_2$, $INV_3$, $NOR_1$, $NOR_2$ and $OR_1$ can be removed, so that the output signal $S_{AND3}$ of the gate $AND_3$ may be applied directly to the gate $OR_2$ and the signal pulse $PUL_{2DL}$ may be applied directly to the gate $AND_4$.

In summary, in accordance with the present invention, the relay contacts can be opened and closed without causing any arc to be generated, the relay contacts can be forcibly opened or closed in the case of the D.C. source interruption and, as required, the state of the relay contacts prior to the source interruption can be safely maintained even after the restoration.

What is claimed as our invention is:

1. An A.C. switching circuit including a first contact means connected through a diode in series with an A.C. source and a load, a second contact means connected in parallel with a series circuit of said diode and said first contact means, first and second latching relays respectively for driving said first and second contact means to open and close their contacts, and first and second flip-flops respectively for actuating said first and second latching relays; said switching circuit comprising (a) a first detection circuit for generating a pulse in response to each cycle of an A.C. source current when said first and second contact means are opened, (b) a second detection circuit for generating a pulse in response to each said cycle of said source current when the first and second contact means are closed, (c) a signal source of instructions for opening and closing the first and second contact means, (d) a first gate circuit allowing an output of said first detection circuit passed therethrough when an instruction for closing the first and second contact means is provided from said signal source, (e) a second gate circuit allowing an output of said second detection circuit passed therethrough when an instruction for opening the first and second contact means is provided from the signal source, (f) a first monostable multivibrator generating an output of a predetermined width in response to outputs of said first and second gate circuits, (g) a second monostable multivibrator generating an output having a width smaller than said predetermined width of said output of said first multivibrator, (h) third and fourth gate circuits applying said outputs of said first and second multivibrators to a first drive terminal of each of said first and second flip-flops when said instruction for closing the first and second contact means is provided from the signal source, and (i) fifth and sixth gate circuits applying said outputs of said first and second multivibrators to a second drive terminal of each of said first and second flip-flops when said instruction for opening the first and second contact means is provided from the signal source.

2. A circuit according to claim 1, wherein said first to sixth gate circuits respectively comprise an AND gate, said AND gate of the first gate circuit being connected at one input terminal to said first detection circuit and at the other input terminal to said instruction signal source, said AND gate of the second gate circuit being connected at one input terminal to said second detection circuit and at the other input terminal to said signal source through an inverter, said AND gate of the third gate circuit being connected at first and second input terminals respectively to output terminals of said first and second multivibrators and at a third input terminal to the signal source, said AND gate of the fourth gate circuit being connected at a first input terminal to said output terminal of the first multivibrator through an inverter, at a second input terminal directly to said output terminal of the second multivibrator and at a third input terminal directly to the signal source, said AND gate of the fifth gate circuit being connected at a first input terminal to the output terminal of the first multivibrator through an inverter, at a second input terminal directly to the output terminal of the second multivibrator and at a third input terminal to the signal source through an inverter, and said AND gate of the sixth gate circuit being connected at first and second input terminals respectively to each of the output terminals of the first and second multivibrators and at a third input terminal to the signal source through an inverter, whereby the signal source generates signals respectively of high level in response to said contact opening instruction and of low level in response to said contact closing instruction.

3. A circuit according to claim 1 or 2, which further comprises a circuit for detecting a restoration of interrupted D.C. source and generating a signal which varies during a predetermined period only upon said restoration, said signal being provided to an input terminal of said first monostable multivibrator, whereby at least one of forcibly opening and closing operations of said first and second contacts and their previous-state maintaining operation is performed.

4. A circuit according to claim 2, which further comprises a circuit for detecting a restoration of interrupted D.C. source and generating a first signal which increases upon a predetermined level reached by a restored source voltage after the interruption, a second signal which is at high level upon said predetermined level reached and a third signal which increases as said interrupted D.C. source starts to restore and becomes low level before said first signal reaches another predetermined level; a NAND gate which receives said instruction signals from said signal source and said first signal from said restoration detecting circuit, said NAND gate being connected at an output terminal directly to said the other input terminal of said second AND gate and said third input terminal of respective said fifth and sixth AND gates, and through an inverter to said the other input terminal of said first AND gate and said third input terminal of respective said third and fourth AND gates; a seventh AND gate which receives said second and third signals of the restoration detecting circuit; an eighth AND gate connected to an output terminal of said seventh AND gate and an output terminal of said second detection circuit; a first NOR gate connected at one input terminal directly and at the other input terminal through a inverter to said output terminal of the seventh AND gate; a ninth AND gate connected at one input terminal to an output terminal of said first NOR gate; a second NOR gate connected at an input terminal to the output terminals of said first and second monostable multivibrators and at an output terminal to the other input terminal of said ninth AND gate; a first OR gate connected at an input terminal to the output terminals of said eighth and ninth AND gates; a second OR gate connected at respective input terminals to the output terminals of said first and second AND gates and to the output terminal of said first NOR gate and at an output terminal to the input terminal to said first multivibrator; and a tenth AND gate which receives directly an output from said second detection circuit and said second signal from said restoration detecting circuit and through an inverter an output from said seventh AND gate, and provides an output to said one input terminal of said second AND gate.

* * * * *